United States Patent
Rosenberg

(10) Patent No.: US 7,603,414 B2
(45) Date of Patent: Oct. 13, 2009

(54) SYSTEM, METHOD AND COMPUTER PROGRAM PRODUCT FOR COLLABORATIVE BACKGROUND MUSIC AMONG PORTABLE COMMUNICATION DEVICES

(75) Inventor: Louis B. Rosenberg, Arroyo Grande, CA (US)

(73) Assignee: Outland Research, LLC, Pismo Beach, CA (US)

( * ) Notice: Subject to any disclaimer, the term of this patent is extended or adjusted under 35 U.S.C. 154(b) by 497 days.

(21) Appl. No.: 11/610,615

(22) Filed: Dec. 14, 2006

(65) Prior Publication Data

US 2007/0106726 A1 May 10, 2007

Related U.S. Application Data

(63) Continuation of application No. 11/267,079, filed on Nov. 3, 2005, now Pat. No. 7,542,816, and a continuation of application No. 11/533,037, filed on Sep. 19, 2006, and a continuation of application No. 11/223,368, filed on Sep. 9, 2005.

(60) Provisional application No. 60/793,214, filed on Apr. 19, 2006.

(51) Int. Cl.
*G06F 15/16* (2006.01)

(52) U.S. Cl. .................. 709/204; 709/203; 709/208; 709/205; 709/224; 709/223; 725/88; 725/100; 725/102; 705/2; 705/1; 705/4; 705/5; 705/7

(58) Field of Classification Search ......... 709/203–205, 709/208, 224, 223, 219, 217
See application file for complete search history.

(56) References Cited

U.S. PATENT DOCUMENTS

| 4,054,749 A | 10/1977 | Suzuki |
| 5,164,530 A | 11/1992 | Iwase |
| 5,614,687 A | 3/1997 | Yamada et al. |

(Continued)

FOREIGN PATENT DOCUMENTS

WO   WO2006086439 A1   8/2006

OTHER PUBLICATIONS

U.S.P.T.O., *Office Action from 11341021 dated Jan. 18, 2008.*

(Continued)

*Primary Examiner*—Jude J Jean Gilles
(74) *Attorney, Agent, or Firm*—Thomas F. Lebens; Sinsheimer Juhnke Lebens & McIvor, LLP

(57) ABSTRACT

A system, method and computer program product for enabling a plurality of users engaged in real-time voice communications over a wireless communications link to collaboratively select one or more musical media files and to jointly listen to the collaboratively selected musical media in approximate synchronicity as a mutually perceivable background musical stream. The background musical stream is audibly output to each of the plurality of users in audio combination with the exchanged real-time voice communications such that the exchanged voice communications is intelligible to each user along with the background musical stream. Each user is situated proximal to a portable communication device that enables the real-time voice communications, the collaborative selection of musical media, and the audio combination of voice communications and musical media.

24 Claims, 4 Drawing Sheets

U.S. PATENT DOCUMENTS

| | | | |
|---|---|---|---|
| 5,728,960 | A | 3/1998 | Sitrick |
| 5,747,714 | A | 5/1998 | Kniest et al. |
| 6,192,340 | B1 | 2/2001 | Abecassis |
| 6,199,067 | B1 | 3/2001 | Geller |
| 6,230,047 | B1 | 5/2001 | McHugh |
| 6,298,323 | B1 | 10/2001 | Kaemmerer |
| 6,323,412 | B1 | 11/2001 | Loo |
| 6,526,411 | B1 | 2/2003 | Ward |
| 6,564,210 | B1 | 5/2003 | Korda et al. |
| 6,623,427 | B2 | 9/2003 | Mandigo |
| 6,657,116 | B1 | 12/2003 | Gunnerson |
| 6,686,531 | B1 | 2/2004 | Pennock et al. |
| 6,721,706 | B1 | 4/2004 | Strubbe et al. |
| 6,765,495 | B1 | 7/2004 | Dunning et al. |
| 6,801,837 | B2 | 10/2004 | Carlstedt et al. |
| 6,804,643 | B1 | 10/2004 | Kiss |
| 6,812,394 | B2 | 11/2004 | Weissflog |
| 6,906,643 | B2 | 6/2005 | Samadani |
| 6,941,324 | B2 | 9/2005 | Plastina et al. |
| 6,983,139 | B2 | 1/2006 | Dowling et al. |
| 6,987,221 | B2 | 1/2006 | Platt |
| 7,046,588 | B2 | 5/2006 | Heo |
| 7,138,575 | B2 | 11/2006 | Childs et al. |
| 7,207,935 | B1 | 4/2007 | Lipo |
| 7,227,071 | B2 | 6/2007 | Tagawa et al. |
| 7,249,126 | B1 | 7/2007 | Ginsburg et al. |
| 7,330,112 | B1 | 2/2008 | Emigh et al. |
| 7,489,979 | B2 | 2/2009 | Rosenberg |
| 2001/0003542 | A1 | 6/2001 | Kita |
| 2002/0091049 | A1 | 7/2002 | Hisano |
| 2002/0116476 | A1 | 8/2002 | Eyal et al. |
| 2003/0011467 | A1 | 1/2003 | Suomela |
| 2003/0074130 | A1 | 4/2003 | Negishi et al. |
| 2003/0080992 | A1 | 5/2003 | Haines |
| 2003/0089218 | A1 | 5/2003 | Gang et al. |
| 2003/0187837 | A1 | 10/2003 | Cutliss |
| 2003/0193572 | A1 | 10/2003 | Wilson |
| 2003/0195884 | A1 | 10/2003 | Boyd et al. |
| 2003/0217007 | A1 | 11/2003 | Fukushima |
| 2003/0220917 | A1 | 11/2003 | Copperman et al. |
| 2004/0006711 | A1 | 1/2004 | Krishnaswamy et al. |
| 2004/0019588 | A1 | 1/2004 | Doganata et al. |
| 2004/0117306 | A1 | 6/2004 | Karaoguz et al. |
| 2004/0186824 | A1 | 9/2004 | Delic et al. |
| 2004/0203901 | A1 | 10/2004 | Wilson et al. |
| 2004/0215469 | A1 | 10/2004 | Fukushima |
| 2004/0224638 | A1 | 11/2004 | Fadell et al. |
| 2004/0225519 | A1 | 11/2004 | Martin |
| 2004/0254717 | A1 | 12/2004 | Sugahara et al. |
| 2005/0021470 | A1 | 1/2005 | Martin et al. |
| 2005/0039206 | A1 | 2/2005 | Opdycke |
| 2005/0080786 | A1 | 4/2005 | Fish |
| 2005/0088318 | A1 | 4/2005 | Liu et al. |
| 2005/0096047 | A1 | 5/2005 | Haberman et al. |
| 2005/0126370 | A1 | 6/2005 | Takai |
| 2005/0149213 | A1 | 7/2005 | Guzak et al. |
| 2005/0154636 | A1 | 7/2005 | Hildinger et al. |
| 2005/0222981 | A1 | 10/2005 | Lawrence et al. |
| 2005/0278317 | A1 | 12/2005 | Gross et al. |
| 2005/0286546 | A1 | 12/2005 | Basseli et al. |
| 2005/0288954 | A1 | 12/2005 | McCarthy et al. |
| 2006/0060068 | A1* | 3/2006 | Hwang et al. ................ 84/615 |
| 2006/0107822 | A1 | 5/2006 | Bowen |
| 2006/0111621 | A1 | 5/2006 | Coppi et al. |
| 2006/0161621 | A1 | 7/2006 | Rosenberg |
| 2006/0167576 | A1 | 7/2006 | Rosenberg |
| 2006/0167943 | A1 | 7/2006 | Rosenberg |
| 2006/0169125 | A1 | 8/2006 | Ashkenazi |
| 2006/0188109 | A1 | 8/2006 | Makino et al. |
| 2006/0243120 | A1 | 11/2006 | Takai |
| 2006/0276919 | A1 | 12/2006 | Shirai |
| 2006/0288846 | A1 | 12/2006 | Logan |
| 2007/0044641 | A1 | 3/2007 | McKinney et al. |
| 2007/0074618 | A1 | 4/2007 | Vergo |
| 2007/0074619 | A1 | 4/2007 | Vergo |
| 2007/0083323 | A1 | 4/2007 | Rosenberg |
| 2007/0113725 | A1 | 5/2007 | Oliver |
| 2007/0156676 | A1 | 7/2007 | Rosenberg |

OTHER PUBLICATIONS

U.S.P.T.O., *Notice of Allowance for 11285534 mailed Nov. 19, 2008.*
U.S.P.T.O., *Examiner Interview for 11285534 mailed Nov. 19, 2008.*
U.S.P.T.O., *Non Final Office Action from 11223368 mailed Dec. 24, 2008.*
Martin, Keith D., "Sound-Source Recognition: A Theory and Computational Model", *1999 doctoral dissertation from MIT* 1999.
Rosenberg, U.S. Appl. No. 11/223,368, filed Sep. 9, 2005.
Rosenberg, U.S. Appl. No. 11/267,079, filed Nov. 3, 2005.
Rosenberg, U.S. Appl. No. 11/285,534, filed Nov. 22, 2005.
Rosenberg, U.S. Appl. No. 11/298,797, filed Aug. 3, 2006.
Rosenberg, U.S. Appl. No. 11/315,762, filed Dec. 21, 2005.
Rosenberg, U.S. Appl. No. 11/533,037, filed Sep. 19, 2006.
Rosenberg, U.S. Appl. No. 11/562,036, filed Nov. 21, 2006.
Rosenberg, U.S. Appl. No. 11/676,298, filed Jul. 5, 2007.
Rosenberg, U.S. Appl. No. 11/697,732, filed Apr. 8, 2007.
Rosenberg, U.S. Appl. No. 11/744,879, filed Sep. 20, 2007.
U.S.P.T.O., *Office Action from 11298797 mailed Jun. 25, 2008.*
U.S.P.T.O., *Office Action from 11285534 mailed Jul. 21, 2008.*
U.S.P.T.O., *Office Action from 11267079 mailed Jul. 17, 2008.*
U.S.P.T.O., *Office Action from 11315762 mailed Aug. 12, 2008.*
Non Final Office Action from 11610494 mailed Jan. 26, 2009.
Notice of Allowance from 11267079 mailed Feb. 24, 2009.
Examiner Interview Summary from 11267079 mailed Feb. 24, 2009.
Non Final Office Action from 11619605 mailed Apr. 1, 2009 (3502.083).
Notice of Allowance from 11533037 mailed Apr. 30, 2009 (3502.144).

* cited by examiner

SYSTEM, METHOD AND COMPUTER PROGRAM PRODUCT FOR COLLABORATIVE BACKGROUND MUSIC AMONG PORTABLE COMMUNICATION DEVICES

CROSS-REFERENCE TO RELATED APPLICATIONS

This application is a non-provisional application claiming benefit and priority under 35 U.S.C. § 119(e) from co-pending U.S. provisional application Ser. No. 60/793,214 filed on Apr. 19, 2006 to the instant inventor and a common assignee;

this application is also a continuation of co-pending U.S. patent applications Ser. Nos. 11/223,368 filed on Sep. 9, 2005; 11/267,079 filed on Nov. 3, 2005; and 11/533,037 filed on Sep. 19, 2006 also to the instant inventor and the common assignee;

this application is also a related application to co-pending foreign patent application PCT/US2006/004373 filed Feb. 7, 2006 and co-pending U.S. patent application Ser. No. 11/285,534 filed on Nov. 22, 2005 also to the instant inventor and the common assignee; and;

all of the aforementioned patents applications are hereby incorporated by reference in their entirety as if fully set forth herein.

FEDERALLY SPONSORED RESEARCH AND DEVELOPMENT

Not Applicable

REFERENCE TO A MICROFICHE APPENDIX

Not Applicable

RELEVANT INVENTIVE FIELD

The present inventive embodiments relates generally to portable communications devices and more specifically to portable communications devices for concurrently sharing background musical media experiences and performing telephony functions.

BACKGROUND

Cellular telephones have become popular portable communication devices such that a user may easily engage in verbal conversations with one or more other users over a communication network through the exchange of real-time audio conversational content. Electronic media players have also become popular personal entertainment devices due to their highly portable nature and interconnectivity with existing computer networks, for example the Internet. The accessibility and simplicity in downloading music and other electronic media continues to fuel the popularity of these devices as is exemplified by Apple Computer, Inc.'s highly successful iPod™ portable media player. Other manufacturers have competing media players offering various functionalities and file playing compatibilities in an effort to differentiate their products in the marketplace.

As discussed in Apple Computer, Inc., patent application, US 2004/0224638 A1, Ser. No. 10/423,490 to Fadell, et al., which is herein incorporated by reference in its entirety; an increasing number of consumer products are incorporating circuitry to play music and other electronic media. At the present time, cellular telephones and portable media players have become integrated into a common portable electronic that supports both telephony and media file playing functionality.

In the relevant art, the integrated electronic device may perform both functions but not at the same time; a user may talk on the phone, or listen to music, but generally cannot do both simultaneously for it would be disconcerting for one user to be listening to music while conversing on the phone with another user who was not listening to music.

Even more disconcerting would be if two users were each listening to different pieces of music while they were simultaneously holding a telephony conversation between them. As such, a highly desirable feature would provide a plurality of users who are engaged in a real-time voice communication telephony conversation to be able to simultaneously listen to the same piece of music with substantial synchronization of play. Furthermore it would be highly desirable to provide the plurality of users who are engaged in the real-time voice communication telephony conversation, the electronically moderated ability to jointly select the musical media content that they simultaneously listen to during the voice conversation. This would provide for a shared music-selection and music-listening experience among the participants of the person-to-person remote voice communication conversation.

Unless otherwise indicated herein, the approaches described in this section are not prior art to the claims in this application and are not admitted to be prior art by inclusion in this section.

SUMMARY

The various exemplary embodiments described herein address the limitations in the relevant art and provides a system, method and computer program product that provides simultaneous background musical media listening experience and telephony among a plurality of users by means of an integrated portable communications device such as an intelligent cellular telephone. In an exemplary systematic embodiment, a system is provided for collaborative background musical media sharing in audio combination with real-time voice communications. This exemplary systematic embodiment comprises a plurality of portable communications devices, in which each portable communication device includes a processor, a memory coupled to the processor and a transceiver coupled to the processor which is configured to at least exchange real-time voice communications with at least another portable communication device.

The real-time voice communications are comprised of user vocalizations captured by a microphone coupled to each portable communication device. An audio processing subsystem is coupled to the processor and configured to audibly output at least a portion of the exchanged real-time voice communications in audible combination with a mutually perceivable background musical stream.

A collaborative music program is provided and operatively loadable into the memory. The program includes instructions executable by the processor to enable the collaborative selection of a musical media file for generation of the mutually perceivable background musical stream.

In an exemplary methodic embodiment, a method for collaboratively selecting a background musical composition for concurrent play with voice communications is provided. This exemplary methodic embodiment comprises, providing a plurality of portable communications devices, each of the portable communication devices having a processor, a memory, a transceiver and an audio processing subsystem operatively coupled to the processor.

The exemplary methodic embodiment continues by configuring each transceiver to at least exchange real-time voice communications with at least another of the plurality of portable communication devices, the real-time voice communications comprising user vocalizations captured by a microphone coupled to each portable communication device;

configuring each audio processing subsystem to audibly output at least a portion of the exchanged voice communications in audio combination with a mutually perceivable background musical stream and providing a collaborative music program operatively loadable into the memory of at least one of the plurality of portable communication devices, the program including instructions executable by the processor to perform collaborative selection of a musical media file for generation of the mutually perceivable background musical stream.

In an exemplary computer program product (CPP) embodiment, a CPP is embodied in a tangible form which comprises instructions executable by a processor associated with a PCD to programmatically perform a collaborative selection of a musical media file for generation of a mutually perceivable background musical stream in dependence on an electronic representation of at least one user's selection and audibly output the perceivable background musical stream in audio combination with an exchanged real-time voice communications.

BRIEF DESCRIPTION OF DRAWINGS

The features and advantages of the various exemplary embodiments will become apparent from the following detailed description when considered in conjunction with the accompanying drawings. Where possible, the same reference numerals and characters are used to denote like features, elements, components or portions of the various inventive embodiments. It is intended that changes and modifications can be made to the described embodiment without departing from the true scope and spirit of the subject inventive embodiments as generally defined by the claims.

DETAILED DESCRIPTION

The various embodiments described herein comprise communication arrangements in which a plurality of individual users may verbally communicate with each other while listening to common background musical media. The various embodiments are generally comprised of a plurality of portable communication devices (PCD), each of the PCDs being associated with at least one user and connected by at least one communication network such that the users of two or more PCDs may engage in verbal telephonic communications while listening to the common background musical media.

In this way, a plurality of users may engage in a telephonic communications while simultaneously listening to a common piece of background music that is presented to each of the users in approximate synchronicity through each of their respective PCDs. In some embodiments, a common piece of visual content, such as video media, may also be played to the plurality of user's in approximate synchronicity. Where necessary, computer programs, routines and algorithms are envisioned to be programmed in a high level language, for example Java™ C++, C, C#, CORBA or Visual Basic™.

Figure 1:
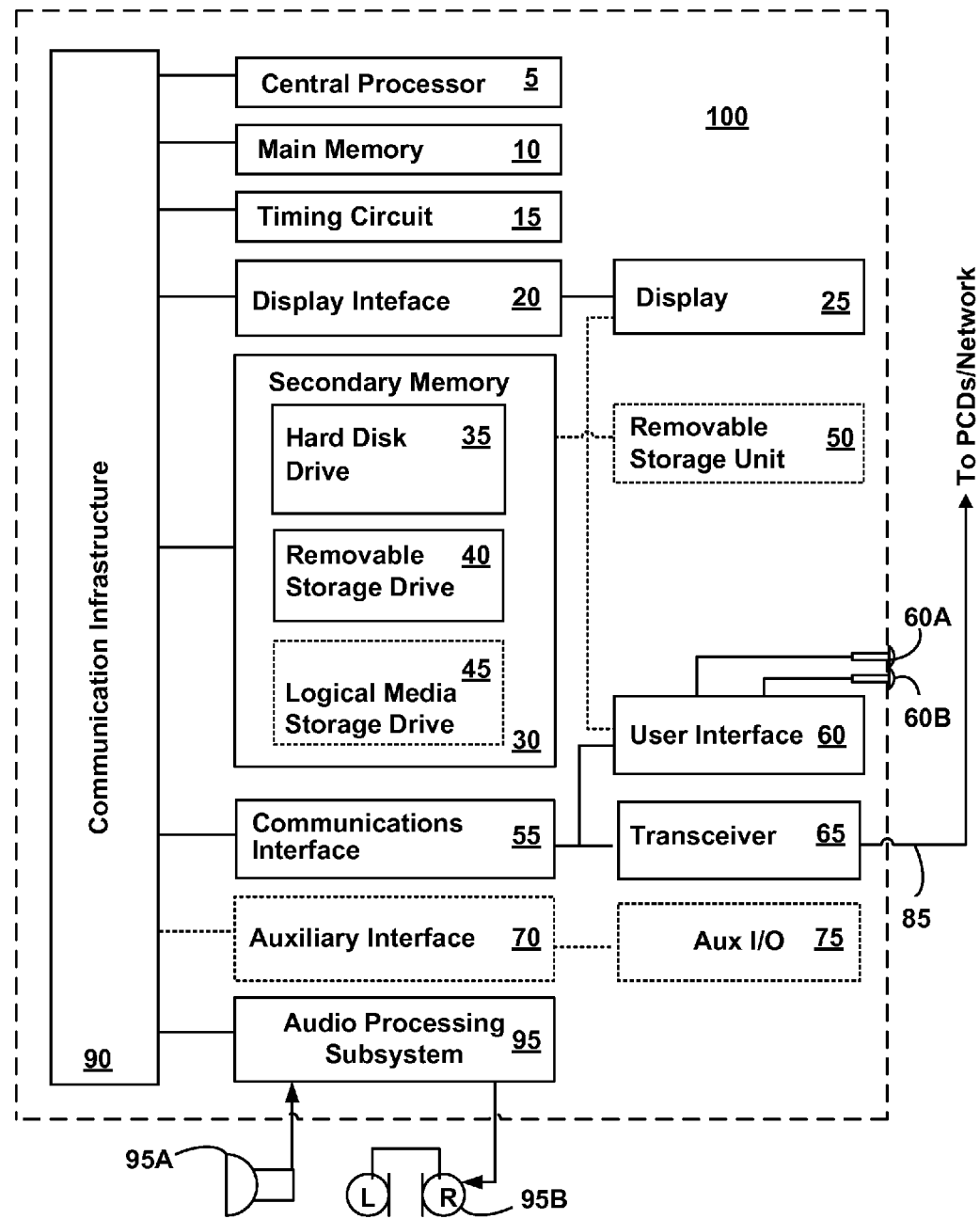
FIG. 1—depicts a generalized and exemplary block diagram of a portable communications device (PCD).

Referring to FIG. 1, a generalized block diagram of a portable communication device (PCD) 100 is depicted. The PCD 100 may be configured as a cellular telephone, personal digital assistant, and/or portable media player. The PCD 100 may also be head-worn, for example as a headset or earpiece.

The PCD 100 includes a communications infrastructure 90 used to transfer data, memory addresses where data items are to be found and control signals among the various components and subsystems of the PCD 100. A processor 5 is provided to interpret and execute logical instructions stored in the main memory 10. The main memory 10 is the primary general purpose storage area for instructions and data to be processed by the processor 5. The main memory 10 is used in its broadest sense and includes RAM, EEPROM and ROM. A timing circuit 15 is provided to coordinate activities within the PCD 100. The processor 5, main memory 10 and timing circuit 15 are directly coupled to the communications infrastructure 90.

A display interface 20 is provided to drive a display 25 associated with the PCD 100. The display interface 20 is electrically coupled to the communications infrastructure 90 and provides signals to the display 25 for visually outputting both graphics and alphanumeric characters. The display interface 20 may include a dedicated graphics processor and memory to support the displaying of graphics intensive media. The display 25 may be of any type (e.g., cathode ray tube, gas plasma) but in most circumstances will usually be a solid state device such as liquid crystal display.

A secondary memory subsystem 30 is provided which houses retrievable storage units such as a hard disk drive 35, a removable storage drive 40, an optional logical media storage drive 45 and an optional removal storage unit 50. The removable storage drive 40 may be a replaceable hard drive, optical media storage drive or a solid state flash RAM device. The logical media storage drive 45 may be flash RAM device, EEPROM encoded with playable media, or optical storage media (CD, DVD). The removable storage unit 50 may be logical, optical or of an electromechanical (hard disk) design.

A communications interface 55 subsystem is provided which allows for standardized electrical connection of peripheral devices to the communications infrastructure 90 including, serial, parallel, universal serial bus (USB), Bluetooth, and Firewire connectivity. A user interface 60 and a transceiver 65 are electrically coupled to the communications infrastructure 90 via the communications interface 55. For purposes of this disclosure, the term user interface 60 includes the hardware, software and/or firmware by which a user interacts with the PCD 100 and the means by which the PCD 100 conveys information to the user and may include the display 25.

The user interface 60 employed on the PCD 100 may include a pointing device (not shown) such as a mouse, thumbwheel or track ball, an optional touch screen (not shown); one or more pushbuttons 60A, 60B; one or more sliding or circular potentiometer controls (not shown), one or more switches (not shown). One skilled in the relevant art will appreciate that the user interface devices which are not shown are well known and understood. To accommodate non-standardized communications interfaces (i.e., proprietary), an optional separate auxiliary interface 70 and auxiliary I/O port 75 are provided to couple proprietary peripheral devices to the communications infrastructure 90.

The transceiver 65 facilitates the remote exchange of data and synchronizing signals over a network 85 to which other PCDs 100 may be connected. The transceiver 65 is envisioned to be compatible with at least one digital cellular communications standard, for example GSM, 3G and evolving cellular communications standards. Both peer-to-peer (PPP) and client-server models are envisioned for implementation of the various embodiments. Alternatively, the transceiver 65 may be of a radio frequency type normally associated with computer networks for example, wireless computer networks based on BlueTooth™ or the various IEEE standards 802.11x, where x denotes the various present and evolving wireless computing standards. In a third alternative embodiment, the transceiver 65 may include hybrids of computer communications standards, cellular standards and evolving satellite radio standards.

An audio processing subsystem 95 is provided and electrically coupled to the communications infrastructure 90. The audio processing subsystem 95 is configured for the storage and play of digital background musical media, for example, multi or multimedia encoded in any of the exemplary formats MP3, AVI, WAV, MPG, QT, WMA, AIFF, AU, RAM, RA, MOV, MIDI, etc. As referred to in this specification, "background musical media" refers to video, audio, streaming and any combination thereof. The audio processing subsystem 95 includes a microphone input port 95A and a headphone or speaker output port 95B. Connection of the microphone 95A and/or headset 95B to the audio processing subsystem 95 includes both traditional cable and wireless arrangements known in the relevant art. In addition, the audio processing subsystem 95 is envisioned to optionally include features such as graphic equalization, volume, balance, fading, base and treble controls, surround sound emulation, and noise reduction. One skilled in the relevant art will appreciate that the above cited list of file formats is not intended to be all inclusive.

In addition, the microphone 95A is configured such that it may easily capture the user's voice when speaking normally as is well known to the art of cellular phones. In some advanced embodiments, the microphone 95A may be of a bone conducting type as is known in the art associated with cellular telephony.

The PCD 100 includes an operating system, the necessary hardware and software drivers necessary to fully utilize the devices coupled to the communications infrastructure 90, including software to support telephony functionality and software to support media receipt, storage, and playback. In addition, each PCD 100 includes at least one collaborative background media program 200 (FIG. 2) operatively loadable into main memory 10. The collaborative background media program 200 is configured to enable a plurality of users of the PCDs 100 to engage in real-time telephonic conversations over the communications network 85 while jointly experiencing common background musical media. The collaborative background media program 200 may optionally be configured to provide automatic volume control of the amplitude of the playing background musical media based upon the detected presence of a voice stream from one or more of the users engaged in the real-time telephonic conversation over the communications network 85.

The collaborative background media program 200 is further configured to allow one or more users to select the background musical media to be played. In various exemplary embodiments, the collaborative background media program 200 includes features to allow a plurality of users, each using their own PCD 100, to jointly select the background musical media to be played.

Such features may be enabled through an electronically moderated turn-taking process in which the background musical media 205 selections are made based on media selections entered by one or more users in a prescribed progression. For example, a first user of a first PCD 100 may select a first musical media file for background play, then a second user of a second PCD 100 may select a second musical media file for background play, and so on, in a cyclic and/or repeating turn-taking process moderated under electronic control.

Alternately, such features may be enabled through an electronically moderated playlist-combining process in which the background musical media 205 selections are made based upon a plurality of stored playlists, each of the stored playlists being associated with a different PCD 100 engaged in the voice communication session. For example, a first musical media file may be selected based upon a first stored playlist associated with a first PCD 100, then a second musical media file may be selected based upon a second stored playlist on a second PCD 100, and so on, in a cyclic and/or repeating turn-taking process that is moderated under electronic control.

Alternatively, such features may be enabled through an electronically moderated suggestion and acceptance process in which the background musical media 205 selections are made based upon a musical media suggestion entered by a first user into a first PCD 100 as well as based upon an acceptance and/or rejection response entered by one or more other users into other PCD devices. Optionally, the PCD 100 may also include at least one remote authentication application, one or more cryptography applications capable of performing symmetric and asymmetric cryptographic functions, and secure messaging software.

Figure 2:
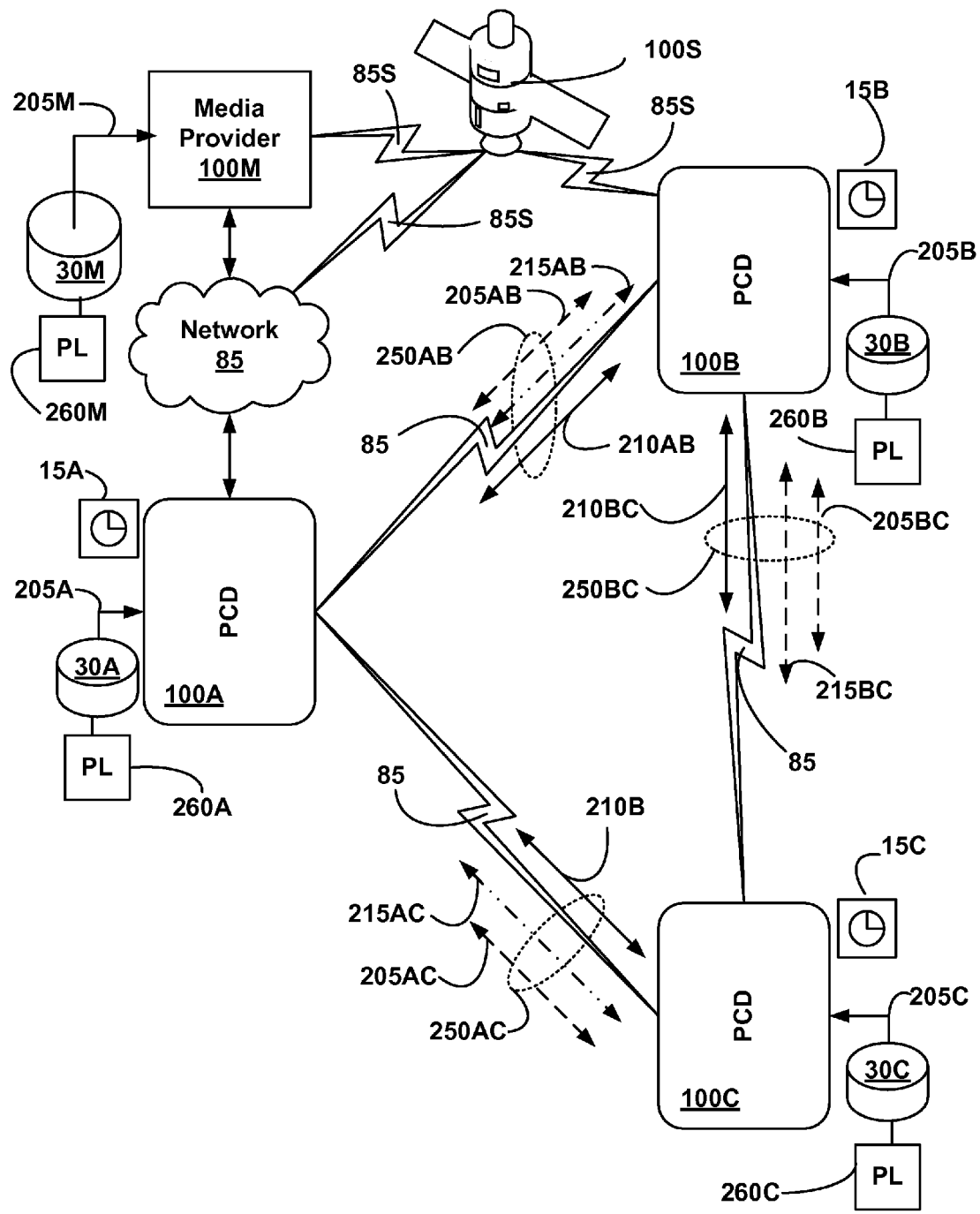
FIG. 2—depicts a detailed exemplary block diagram of voice communications combined with collaborative background music playback.

FIG. 2 depicts various exemplary embodiments where real-time voice communications are exchanged and combined with a background musical media stream that has been collaboratively selected. In a first exemplary embodiment, a first PCD 100A establishes a voice communications 210AB, 210AC session with two other PCDs 100B, 100C over a communications network 85. The communication network 85 may be a peer-to-peer type arrangement using for example, using a BlueTooth™ communications protocol. Alternately, the communications network 85 may be provided using a WI-FI, cellular and/or other broadband wireless network.

In this exemplary embodiment, a user in proximity of the first PCD 100A is in real-time voice communications 210AB, 210BC with two separate users in proximity to the second and third PCDs 100B, 100C. The collaborative background media program 200, each of the users under a moderation of an electronic process, to agree on a musical media file that is locally available from the datastores 30A, 30B, 30C coupled to the PCDs 100A, 100B, 100C. In this exemplary embodiment, the background musical media stream 205A, 205B, 205C is generated locally at each of the PCDs 100, 100A, 100B and only the voice stream 210AB, 210BC, 210AC is actually transmitted over the network 85.

The collaboratively selected background musical media file is synchronized for background play by sending timing signals over the network 85. Each PCD 100A, 100A, 100B is synchronized using its internal clock or counter 15A, 15B, 15C with the received synchronizing signals sent as digital collaboration parameters 215AB, 215BC, 215AC.

The timing circuits 15A, 15B, 15C are used to ensure that the background music stream 205AB, 205BC, 205AC is played in approximate synchronicity among the PCDs 100A, 100A, 100B such that each user is experiencing the same musical content contemporaneously.

The determination of which common musical media file or files to be background played may be accomplished using one or more of a variety of electronically moderated collaborative processes, for example, a turn-taking user selection process, a playlist-combining process, and/or a user suggestion and acceptance process. In a playlist combination process, the determination of the common musical media file or files is accomplished by selecting one or more media files from each of a plurality of local playlists 260A, 260B, 260C. This may be accomplished by exchanging the digital collaborative parameters 215AB, 215BC, 215AC among the participating PCDs 100A, 100B, 100C. In such a way, a plurality of playlists 260A, 260B, 260C, each associated with a different participating PCD, may be combined in an interlaced manner so as to jointly direct the selection media items in the collaborative background music stream. Alternately, a common playlist 260M may be obtained from a networked media provider 100M and distributed to each of the participating PCDs 100A, 100B, 100C. The distributed playlist 260M includes the available musical media files that are centrally retrievable 205M from a datastore 30M associated with the media provider 100M.

In another related exemplary embodiment, the background music stream 205AB, 205BC, 205AC is streamed 85S from a satellite service 100S. A collaborative selection process is accomplished using the collaborative background media program 200 which allows a particular satellite channel to be jointly selected by participating users and then streamed 85S among the participating PCDs 100A, 100B, 100C. This may be accomplished, for example, by an electronically moderated collaborative satellite 100S channel selection process.

The collaborative background media program 200 may perform background musical media selection several various electronically moderated arrangements, including a collaborative vote arrangement, a progressive turn-taking selection arrangement, an automated background musical media file selection arrangement based upon the stored preferences or histories of each of a plurality of users and/or a suggestion and approval/rejection arrangement.

Exemplary musical media selection arrangements for implementing the above described collaborative media selection processes are described in co-pending U.S. and PCT patent applications Ser. Nos. 11/223,368, filed Sep. 9, 2005; 11/267,079 filed Nov. 3, 2005; 11/533,037 filed Sep. 19, 2006; 11/285,534 filed Nov. 22, 2005; and PCT/US2006/004373 filed Feb. 7, 2006; all to the instant inventor and a common assignee and are hereby incorporated by reference their entirety as if fully set forth herein.

The collaborative voting arrangement may be provided by a majority vote or weighted vote where one user has a greater influence on the musical media file selection. In the progressive turn taking selection arrangement, each user may be provided, under electronic moderation, a turn to select a musical media file to be played as a background music stream 205AB, 205BC, 205AC during the voice communications 210AB, 210BC, 210AC. In this arrangement, the electronically moderated selection process progresses to another user following a selection. In the suggestion and acceptance/rejection arrangement, one user may suggest file, through an interaction with a user interface 60 associated with the user's PCD 100A, a musical media file while one or more different users may either accept or reject the suggestion by an analogous interaction with each user's interface 60 associated with the user's PCD 100B, 100C. If rejected, the suggesting user may suggest an alternative musical media file.

In another exemplary embodiment, the collaborative background media program 200 may automatically selects background musical media files for play from among a plurality of available background musical media files based upon electronically stored user preferences. The user preferences may be individually stored in memory of the PCDs 100A, 100B, 100C or upon the media provider 100M. Likewise, the automated selection process may execute on one of the PCDs 100A, 100B, 100C.

In an exemplary embodiment, a consolidated playlist (not shown) may be automatically generated by selecting media items from each of a plurality of local playlists 260A, 260B, 260C and electronically distributing the consolidated playlist to each of the PCDs 100A, 100B, 100C as part of a digital collaborative parameter exchange 215AB, 215BC, 215AC. In this exemplary embodiment, the musical media file selections made from the consolidated playlist which are not local to one or more of the PCDs 100A, 100B, 100C may be played locally at one of the PCDs and streamed over the network 85 to each PCD lacking a local copy of the selected musical media file. The combined real-time voice communications and background musical media stream 250AB, 250BC, 250AC is transmitted over the network 85 to the PCDs in a duplex mode which allows users to speak as if in a typical telephone conversation. Alternately, a temporary copy of the musical media file selected for background play may be distributed over the network 85 so that all PCDs 100A, 100B, 100C have the selected musical media files for background music play.

In another alternate exemplary embodiment, the background musical media stream 205AB, 205BC, 205AC, is sent over one type of wireless communications network and the voice stream 210AB, 210BC, 210AC is sent over a second wireless communications network, for example, WI-FI and cellular telephone networks 85. In this exemplary embodiment, the collaborative background media program 200 may be programmed to control the amplitude level of the background musical media stream 205AB, 205BC, 205AC based on the detection of a voice stream being detected on the second network. The voice stream 210AB, 210BC, 210AC may be comprised of any audio data captured by a vocal microphone 95A coupled to the PCD 100, or may be specifically detected if within the normal voice range of 300-3,000 Hertz.

Figure 3:
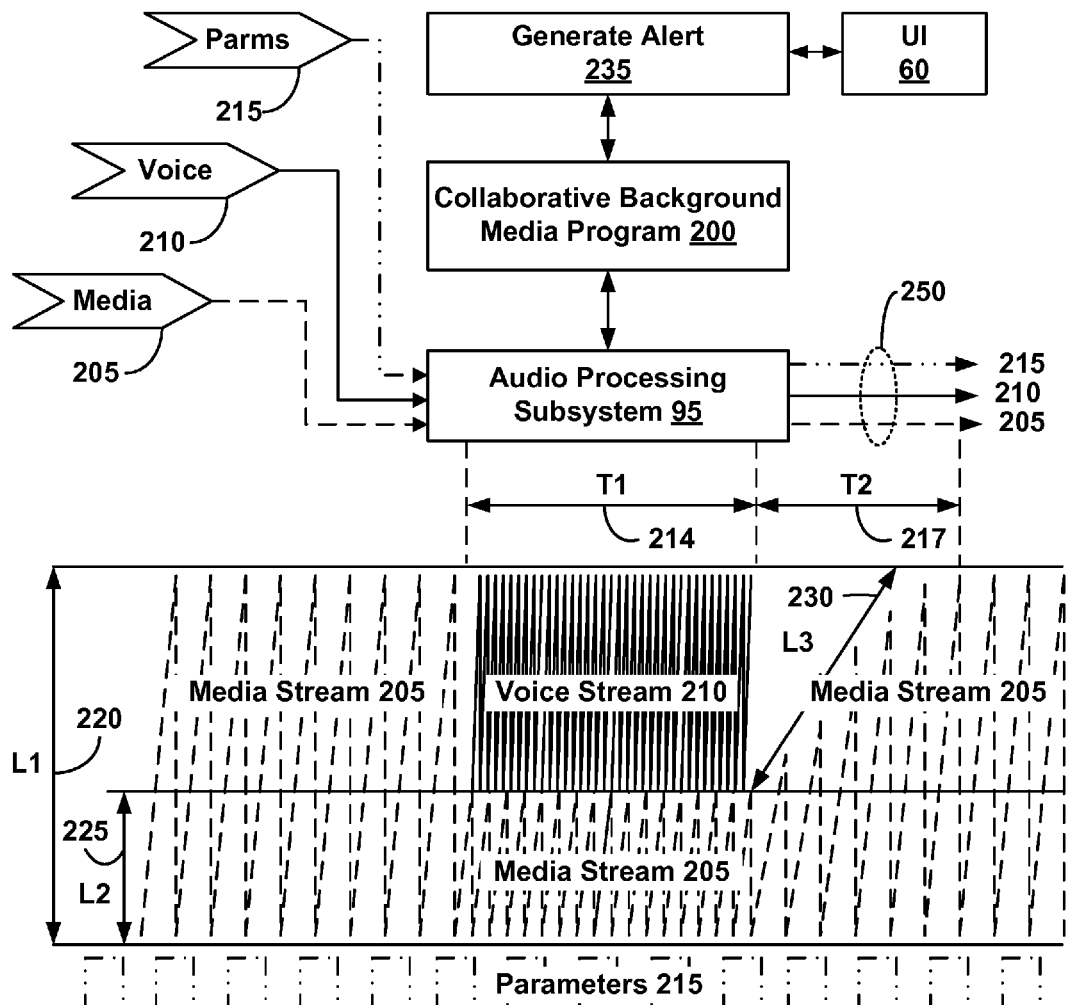
FIG. 3—depicts an exemplary block diagram of a plurality of portable communications devices providing collaborative background musical media sharing.

Referring to FIG. 3, the collaborative background media program 200 interactively monitors the signal processing being accomplished by the audio processing subsystem 95. When a voice stream 210 is identified by the collaborative background media program 200, the collaborative background media program 200 signals the audio processing subsystem 95 to attenuate the background musical media stream 205 from a normal amplitude level L1 220 to a reduced amplitude level L2 225 for the duration T1 215 of the identified voice stream 210. The background musical media stream 205 remains at the attenuated level L2 225 until allowed by the collaborative background media program 200 to resume the nominal playback amplitude level L1 220. The time duration T1 215 for attenuating the amplitude level L2 225 of the background musical media stream 205 may be set to account for pauses between words, phrases or sentences.

In addition, the transition time T2 217 between the attenuated amplitude levels L2 225 to the normal amplitude level L1 220 may be set to allow for a variable ramp up in amplitude level L3 230. The ramp up amplitude level L3 230 allows the background level amplitude to be gradually restored to the nominal playback amplitude level L1 220 to minimize disturbing the user. The various time durations T1 215 and T2 217 may be controlled by a voice activated switch (VOX) circuit (not shown) coupled to the microphone 95A of the user or may be more generally controlled by a processor 5 of the PCD 100 performing voice signal detection and background music attenuation routines.

In an exemplary embodiment, the receipt of the incoming digital collaboration parameters 215, may be used to trigger an alert 235 to the user by providing a visual, tactile and/or audible alarm The alert 235 may be used to prompt a user to accept, reject, or vote upon a background musical media suggested by another user. The alert may include a visual and/or aural display of the title(s) and/or artist(s) of the one or more suggested background musical media selections. Furthermore the alert may include a display of the name, handle, or unique ID of the user(s) who suggested the one or more background musical media selections. Details of such suggesting, alerting, and accepting/rejecting processes are described in co-pending U.S. and PCT patent applications Ser. Nos. 11/223,368, filed Sep. 9, 2005; 11/533,037 filed Sep. 19, 2006; 11/285,534 filed Nov. 22, 2005; and PCT/US2006/004373 filed Feb. 7, 2006; all to the instant inventor and a common assignee and are hereby incorporated by reference their entirety as if fully set forth herein. The alert 235 may require a user to input a response via the user interface 60 coupled to the PCD 100.

The digital collaborative parameters 215 exchanged among the PCDs 100A, 100B, 100C may include additional information including other timing information, PCD settings (e.g., volume, tone, equalization, reference time, counter variable), request to transfer background musical media selection to one of the other collaborating PCDs, individual identification and/or authentication information.

One skilled in the art will appreciate that references made in this specification to messaging, signaling, communicating, transmitting, sending, receiving, submitting suggesting, exchanging, notifying, alerting, voting, etc. should be construed in light of the relevant art regarding digital communications, such as communications involving data transfer from one computer to another through a communications medium without regard to a particular format, data structure or communications protocol.

Figure 4:
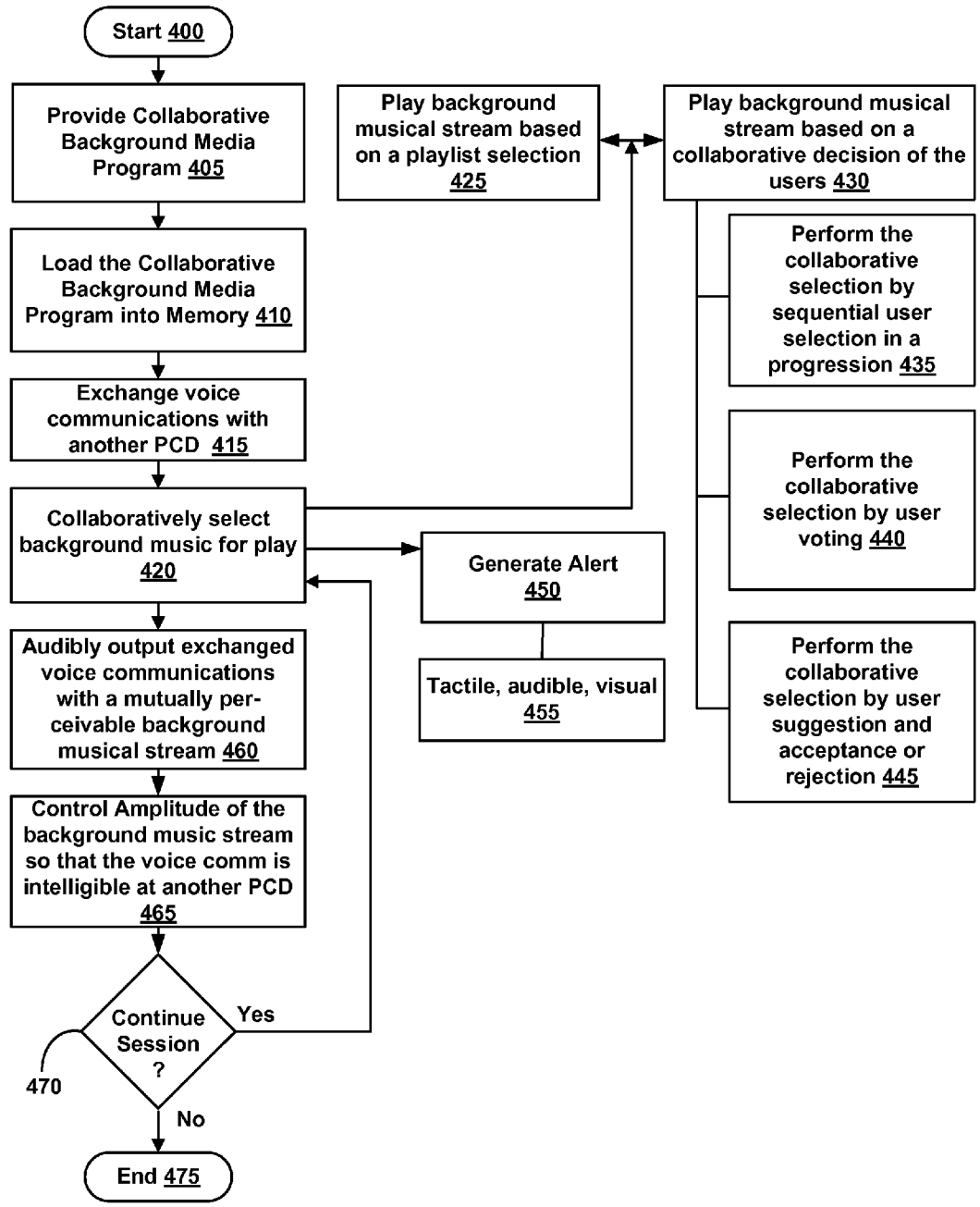
FIG. 4—depicts an exemplary process flow chart of the various exemplary embodiments.

Referring to FIG. 4, a process flow chart is depicted which provides an exemplary method for implementing the various inventive embodiments described herein. The process is initiated 400 by providing a collaborative background media program 405. The program includes instructions executable by a processor associated with a PCD to transceive in real-time voice communications over a communications network, combine a background musical stream with the real-time voice communications, and audibly output the combine voice communications and background music media stream to each user. The collaborative background media program 405 also includes routines for computer moderated collaborative selection of one or more media files that comprise the content of the background musical stream.

The collaborative background media program 405 may optionally control the amplitude of the background musical media stream such that the audibly output voice communications is intelligible to a user situated in cognizable proximity to another portable communications device (PCD.)

The collaborative background media program is loaded into the memory of a PCD 410 and a connection with another PCD is established over at least one communications network 415.

Once a real-time voice communications session is established between two or more PCDs, the collaborative selection of background musical media to be played is performed 420. Collaborative selection may be accomplished by a plurality of mechanisms including but not limited to selecting background musical media from each of a plurality of user playlists to generate the background musical media stream 425. In some such exemplary embodiments, only media items that are locally available within the memories of each of the plurality of PCDs are automatically selected for collaborative play.

In an alternative arrangement, the background musical media stream is accomplished collaboratively among the users 430 through a electronically moderated collaborative music selection process. For example, the collaborative selection may be accomplished using a sequential turn-taking progression among the users 435, by performance of a collaborative vote 440 of the plurality of users, and/or by collaborative suggestion and acceptance/rejection 445 among the plurality of users, as described previously.

In an embodiment, collaboration is accomplished by exchanging digital collaboration parameters among the various PCDs. The receipt of the digital collaborative parameters may cause an alert to be locally generated 450. The alert may be tactile, audible, visual and/or any combination thereof 455.

The background musical media stream is audibly output along with the exchanged real-time voice communications. The background musical media stream is audibly output such that each user may mutually perceive the background musical stream in approximate synchronicity 460. In an optional embodiment, the collaborative background media program varies an amplitude of the background musical media stream in real-time in response to changes in the voice communication stream to ensure that the voice communications conveyed between the PCDs are intelligible above the continuing background musical media stream.

If the users decide to end the collaborative background musical session, the collaborative background media program is terminated which ends the session 475. Alternately, the process repeats by providing another collaborative background musical media selection session 420 as described above.

The foregoing described exemplary embodiments are provided as illustrations and descriptions. They are not intended to limit an inventive scope to any precise form described. In particular, it is contemplated that functional implementation of the instrument accompaniment program described herein may be implemented equivalently in hardware, software, firmware, and/or other available functional components or building blocks. Other variations and embodiments are possible in light of above teachings, and it is not intended that this Detailed Description limit the scope of inventive embodiments, but rather by the Claims following herein.

What is claimed:

1. A system for collaboratively selecting a background musical composition for concurrent play with voice communications comprising:

a plurality of portable communications devices, each portable communication device comprising;

a processor;

a memory coupled to the processor;

a transceiver coupled to the processor configured to at least exchange real-time voice communications with at least another portable communication device; the real-time voice communications comprising user vocalizations captured by a microphone coupled to each portable communication device;

an audio processing subsystem coupled to the processor configured to audibly output at least a portion of the exchanged real-time voice communications in audible combination with a mutually perceivable background musical stream; and, a collaborative music program operatively loadable into the memory including instructions executable by the processor to enable the collaborative selection of a musical media file for generation of the mutually perceivable background musical stream.

2. The system according to claim 1 wherein the collaborative selection of a musical media file is performed by a sequential selection of a musical media file by a plurality of users assigned to an electronically moderated turn-taking progression.

3. The system according to claim 1 wherein the collaborative selection of a musical media file is performed by a suggestion and an acceptance arrangement in which a user electronically suggests a musical media file through an interaction with a portable communication device associated with the user and a different user electronically accepts or rejects the suggested musical media file through an interaction with another portable communication device associated with the different user.

4. The system according to claim 2 wherein the sequential selection of a musical media file occurs during a voice communications exchange session.

5. The system according to claim 1 wherein the collaborative selection of a musical media file is performed by an electronically moderated vote of a plurality of users engaged in the exchange of the real-time voice communications.

6. The system according to claim 1 wherein the collaborative selection of a musical media file is performed by sequential selection of a first musical media file from a first playlist of a first user of a first portable communication device followed by a selection of a second musical media file from a second playlist of a second user of a second portable communication device.

7. The system according to claim 6 wherein the collaborative selection of a musical media file is further performed during a voice communications exchange session.

8. The system according to claim 1 wherein the collaboratively selected musical media file when played is mutually perceivable in approximate synchronicity among a plurality of users associated with the plurality of portable communication devices.

9. The system according to claim 1 wherein the collaborative music program further includes instructions to control an amplitude of the mutually perceivable background musical stream such that the exchanged real-time voice communications are intelligible to a plurality users situated in cognizable proximity to each of the plurality of portable communications devices.

10. The system according to claim 3 wherein the collaborative music program further includes instructions executable by the processor to generate a user cognizable alert when a collaborative input is required to be entered into a portable communication device associated with the user.

11. The system according to claim 10 wherein the collaborative input is entered by a user interaction with a user interface coupled to the portable communication device.

12. The system according to claim 1 wherein the collaboratively selected musical media file is locally available to each of the plurality of portable communications devices.

13. The system according to claim 1 wherein the collaboratively selected musical media file is locally available to at least one of the plurality of portable communications devices and remotely available to at least another of the plurality of portable communications devices.

14. The system according to claim 1 wherein the collaboratively selected musical media file is remotely available to at least a portion of the plurality of portable communications devices.

15. A method for collaboratively selecting a background musical composition for concurrent play with voice communications comprising:
providing a plurality of portable communications devices, each of the portable communication devices having a processor, a memory, a transceiver and an audio processing subsystem operatively coupled to the processor;
configuring each transceiver to at least exchange real-time voice communications with at least another of the plurality of portable communication devices, the real-time voice communications comprising user vocalizations captured by a microphone coupled to each portable communication device;
configuring the audio processing subsystem of each portable communication device to audibly output at least a portion of the exchanged voice communications in audio combination with a mutually perceivable background musical stream; and,
providing a collaborative music program operatively loadable into the memory of at least one of the plurality of portable communication devices, the program including instructions executable by the processor to perform collaborative selection of a musical media file for generation of the mutually perceivable background musical stream.

16. The method according to claim 15 wherein the collaborative music program further includes instructions for performing the collaborative selection by enabling the sequential selection of one or more musical media files by each of a plurality of users of associated with each of the plurality of portable communication devices, each of the plurality of users being assigned to an electronically moderated turn-taking progression.

17. The method according to claim 15 wherein the collaborative music program further includes instructions for performing the collaborative selection by a user electronically suggesting a musical media file through an interaction a portable communication device associated with the user and a different user electronically accepting or rejecting the suggested musical media file through an interaction with a portable communication device associated with the different user.

18. The method according to claim 15 wherein the collaborative music program further includes instructions for performing the collaborative selection by selecting a first musical media file from a first playlist associated with a first portable communication device followed by selecting a second musical media file from a second playlist associated with a second portable communication device.

19. A computer program product embodied in a tangible form comprising instructions executable by a processor associated with a portable communications device to programmatically perform a collaborative selection of a musical media file for generation of a mutually perceivable background musical stream in dependence on an electronic representation of at least one user's selection and audibly output the perceivable background musical stream in audio combination with an exchanged real-time voice communications, the real-time voice communications comprising user vocalizations captured by a microphone coupled to each portable communication device.

20. The computer program product according to claim 19 wherein the tangible form is one of; a logical media, a magnetic media and an optical media.

21. The computer program product according to claim 19 wherein the collaborative selection is performed by a sequential selection of a musical media file by a plurality of users assigned to an electronically moderated turn-taking progression.

22. The computer program product according to claim 19 wherein the collaborative selection is performed by a suggestion and acceptance arrangement in which a user electronically suggests a musical media file through an interaction with his or her portable communication device and one or more other users electronically accept or reject the suggested musical media file through an interaction with each of their portable communication devices.

23. The computer program product according to claim 19 wherein the collaborative selection of a musical media file is performed by an electronically moderated vote of a plurality of the users engaged in the real-time voice communication.

24. The computer program product according to claim 19 wherein the collaborative selection of a musical media file is performed by sequential selection of a first musical media file from a first playlist of a first user of a first portable communication device followed by the selection of a second musical media file from a second playlist of a second user of a second portable communication device.

* * * * *

UNITED STATES PATENT AND TRADEMARK OFFICE
CERTIFICATE OF CORRECTION

PATENT NO.        : 7,603,414 B2
APPLICATION NO. : 11/610615
DATED             : October 13, 2009
INVENTOR(S)      : Rosenberg It is certified that error appears in the above-identified patent and that said Letters Patent is hereby corrected as shown below:

Claim 1, column 10, line 54, delete "comprising;" and insert --comprising:--.
Claim 1, column 10, line 59, delete "device;" and insert --device,--.
Claim 6, column 11, line 29, after "by" insert --a--.
Claim 9, column 11, line 48, after "plurality" insert --of--.
Claim 16, column 12, line 36, after "of users" delete "of".
Claim 17, column 12, line 43, after "interaction" insert --with--.
Claim 20, column 13, line 2, delete "of;" and insert --of:--.
Claim 24, column 14, line 9, after "by" insert --a--.

Signed and Sealed this

Twenty-second Day of December, 2009

David J. Kappos
*Director of the United States Patent and Trademark Office*